United States Patent [19]

Chapman et al.

[11] Patent Number: 5,789,501
[45] Date of Patent: Aug. 4, 1998

[54] PROCESS FOR POLYMERISING OLEFIN IN GAS PHASE

[75] Inventors: Geoffrey Chapman, Sausset-Les-Pins, France; Stephen Kevin Lee; Michael Bernard Power, both of London, England; Bruno Grenouiller, Martigues, France

[73] Assignee: BP Chemicals Limited, England

[21] Appl. No.: 782,261

[22] Filed: Jan. 15, 1997

Related U.S. Application Data

[63] Continuation of Ser. No. 437,171, May 8, 1995, abandoned.

[30] Foreign Application Priority Data

May 16, 1994 [FR] France ................................. 94 06221

[51] Int. Cl.⁶ ...................................................... C08F 6/00
[52] U.S. Cl. .............................. 526/68; 526/69; 528/483; 528/499
[58] Field of Search ...................... 526/68, 69; 528/483, 528/499

[56] References Cited

U.S. PATENT DOCUMENTS

| | | | |
|---|---|---|---|
| 4,029,877 | 6/1977 | Yoshiura et al. | 528/483 |
| 4,156,075 | 5/1979 | Holliday et al. | 528/483 |
| 4,258,158 | 3/1981 | Pfeiffer | 526/68 |
| 4,314,053 | 2/1982 | Lin et al. | 528/483 |
| 4,372,758 | 2/1983 | Bobst et al. | 55/48 |
| 4,758,654 | 7/1988 | Brod et al. | 528/483 |
| 5,071,950 | 12/1991 | Borho et al. | 528/483 |

FOREIGN PATENT DOCUMENTS 0341540  11/1989  European Pat. Off. .

*Primary Examiner*—David W. Wu

[57] ABSTRACT

The present invention relates to a process for continuously manufacturing ethylene (co-)polymer in a gaseous phase in a polymerization zone through which passes an essentially gaseous reaction mixture comprising the (co-)monomers(s). In addition the process comprises transferring a mixture (A) formed by the gaseous reaction mixture and the solid (co-)polymer in a depressurization zone, and separating the mixture (A) into a solid phase (B) and a gaseous phase (C) returned into the polymerization zone. The solid phase (B) is subjected to (1) at least one non-deactivating flushing with respect to the active catalytic residues, and subsequently (2) a deactivating flushing with a gaseous mixture of nitrogen, water and oxygen. The (co-)polymer thus obtained has very low contents of unreacted (co-)monomer(s) and volatile organic compounds, and exhibits a high whiteness index and a long thermal stability with time.

12 Claims, No Drawings

PROCESS FOR POLYMERISING OLEFIN IN GAS PHASE

This application is a continuation, of application Ser. No. 08/437,171, filed May 8, 1995, now abandoned.

The invention relates to a process for the continuous manufacture of ethylene (co)polymers and possibly of at least one alpha-olefin by catalytic (co)polymerization in a polymerization zone in a gaseous phase.

In a (co-)polymerization process in a gaseous phase, the monomers and comonomers if any may remain occluded in the porous (co-)polymer particles and dissolved in particular in the amorphous parts of the (co-)polymer, in particular when the comonomers are relatively heavy alpha-olefins comprising, for example, from 5 to 8 carbon atoms and which are used in particular in the manufacture of linear low-density polyethylene. In the manufacture of high-density polyethylene, a relatively high polymerization temperature and a large amount of hydrogen used as chain-limiting agent may promote secondary hydrogenation reactions, in particular forming organic compounds of low volatility, containing, for example, from 4 to 12 carbon atoms. Moreover, alkanes of relatively low volatility containing, for example, from 4 to 10 and preferably from 5 to 8 carbon atoms, may be used as inert constituents in processes for the polymerization of olefins in a gaseous phase with a view to improving the production. These organic compounds and alkanes of low volatility may also remain occluded and dissolved in the porous polyolefin particles. It is generally essential to remove from the (co-) polymers produced, the unconverted (co)monomers, the organic compounds and the alkanes of relatively low volatility for ecological and economic reasons, but also for safety reasons. All these compounds constitute a load on the environment, they are capable of forming explosive mixtures in the presence of atmospheric oxygen and they adversely affect the quality of the products due to the risk of the prolongation of an uncontrolled residual polymerization outside the polymerization zone. The absence of recovering and recycling of these compounds, in particular of the unconverted (co)monomers, would have the effect of substantially increasing the price of the polyolefins.

Moreover, it is desirable to manufacture polyolefins of a quality which is stable with time irrespective of the low amounts of catalytic residues contained in the polyolefins and to avoid an inopportune and uncontrolled prolongation of a residual polymerization after transfer of the polymer out of the polymerization zone. A polyolefin is sought which is both of stable and constant quality with time and of the highest possible whiteness.

The inventors of the present invention found themselves facing two apparently antagonistic problems. One of the problems possibly consisted in prolonging the process for the manufacture of the polyolefins by a suitable post-treatment in order to improve the reduction in the residual contents of unconverted (co)monomers and of organic compounds and alkanes of low volatility which are occluded and dissolved in the polyolefin particles. The other problem possibly consisted in continuously producing a polyolefin of improved quality, more stable and constant with time, despite the risks of fluctuations in the quality of the polymer which were due to the prolongation of the process by the said post-treatment.

U.S. Pat. No. 4,314,053 discloses an olefin polymerization process containing steps for deactivating the catalytic residues of the polymer and for reducing the oligomers contained in the polymer, in particular when the oligomers have a non-stereospecific nature as in polypropylene. The process includes flushing the polymer with an inert gas containing water and subsequently placing the polymer in contact with a gaseous mixture containing an inert gas, water and a third component chosen from oxygen, carbon monoxide, carbon dioxide, alcohols containing from 1 to 4 carbon atoms and alkene oxides containing from 2 to 4 carbon atoms.

A process has now been found for the (co)polymerization of ethylene in gaseous phase which allows the above-mentioned problems to be solved simultaneously. In particular, a simple process has been found allowing both an improvement in the reduction of the undesirable volatile organic compounds in the (co-) polymers and the quality of the (co-)polymers such that their thermal stability and their whiteness, in particular during their conversion into finished products, and allowing the quality of the (co-)polymers produced continuously to be rendered more stable and constant with time.

A process has thus been found for the continuous manufacture of an ethylene (co)polymer by catalytic (co)polymerization of ethylene with possibly at least one comonomer in a polymerization zone, in a gaseous phase through which passes an essentially gaseous reaction mixture comprising ethylene and possibly at least the comonomer, at a pressure greater than atmospheric pressure, characterized in that the process additionally comprises:

transferring a mixture (A) formed by the gaseous reaction mixture comprising the unconverted (co)monomer(s) and the solid (co)polymer containing active catalytic residues, from the polymerization zone to a depressurization zone, and separating the mixture (A), after reduction of the pressure, into a solid phase (B) and a gaseous phase (C) which is sent directly or indirectly into the polymerization zone, the solid phase (B) being subjected to:
(1) at least one non-deactivating flushing with a gas or a gaseous mixture which is substantially free from any poison with respect to the active catalytic residues, and subsequently
(2) a deactivating flushing with a gaseous mixture of nitrogen, water and oxygen.

The at least one non-deactivating flushing and subsequently the deactivating flushing are preferably carried out continuously.

According to a particular aspect of the present invention, the process comprises a process for the continuous manufacture of ethylene (co)polymer and possibly of at least one olefinic comonomer by catalytic (co)polymerization of ethylene with possibly at least the olefinic comonomer, in a gaseous phase and at a pressure greater than ambient pressure, in particular at an absolute pressure of 0.5 to 5 MPa, and at a temperature below the melting point, preferably below the softening temperature of the (co)polymer, in particular at a temperature of 40° to 120° C., for example 60° to 120° C. or 60° to 110° C., in a polymerization zone containing a mechanically stirred and/or fluidized bed and through which passes a gaseous reaction mixture comprising ethylene, hydrogen, at least one inert gas and possibly at least the olefinic comonomer, transfer of the mixture (A) formed by the (co)polymer powder in the form of porous particles containing the active catalytic residues and the gaseous reaction mixture accompanying the said powder in a depressurization zone, separation of the mixture (A), after reduction of the pressure, into a solid phase (B) and a gaseous phase (C), sending the gaseous phase (C) directly or indirectly to the polymerization zone, and at least two continuous, different and successive flushings of the solid phase (B), a first comprising at least one flushing using a non-deactivating gas and a second performed using a gas which is deactivating with respect to the active catalytic residues of the (co)polymer. More particularly, the solid phase (B) is continuously subjected, in the form of a powder consisting of porous particles, successively to at least two of these abovementioned flushings, the gaseous phase (D) resulting from the non-deactivating flushing preferably being sent, at least in part if not in total, directly or indirectly into the polymerization zone.

The (co)polymer is manufactured continuously in a gaseous phase in a polymerization zone which may contain a mechanically stirred and/or fluidized bed, through which passes an ascending stream of the gaseous reaction mixture comprising the olefinic (co)monomer(s) to be polymerized. Only part of the olefins polymerizes while passing through the bed, so the gaseous reaction mixture exiting the polymerization zone is sent back into the latter using a recycling circuit which generally comprises a compressor and at least one heat exchanger which is capable of removing the heat released on polymerization. It is preferred to use a polymerization zone containing a fluidized bed, for example such as described in European Patent Applications No. 0 351 068 and No. 0 352 022, and which is free from any means of mechanical stirring.

The gaseous reaction mixture preferably comprises ethylene, hydrogen and at least one inert gas which may be chosen from nitrogen and alkanes containing from 1 to 12, preferably from 2 to 8 and more particularly from 4 to 8 or from 5 to 8 carbon atoms, for example n-hexane, n-pentane and isopentane. The process is particularly suitable for a copolymerization of ethylene with at least one alpha-olefin, such that the gaseous reaction mixture additionally comprises at least one olefinic comonomer which may be chosen from alpha-olefins containing from 3 to 12, preferably from 4 to 10 and more particularly from 4 to 8 carbon atoms, for example chosen from propylene, 1-butene and preferably 1-pentene, 1-hexene, 4-methyl-1-pentene, 1-heptene and 1-octene, as well as at least one non-conjugated diene such as ethylidenenorbornene, 4-methyl-1,4-hexadiene, 2-methyl-1,5-hexadiene, 1,5-hexadiene, dicyclopentadiene and 1,4-hexadiene. The gaseous reaction mixture may thus contain in all cases a large proportion of saturated and/or unsaturated heavy hydrocarbons of relatively low volatility, such as alpha-olefins and alkanes containing in particular from 4 to 10, preferably from 5 to 8 carbon atoms. The heavy hydrocarbons may voluntarily be added as constituents of the gaseous reaction mixture and/or be formed in situ in the polymerization zone by secondary reactions, in particular by hydrogenation reactions. Under the temperature and pressure conditions existing in the polymerization zone, it may be observed that the saturated and/or unsaturated heavy hydrocarbons may be found partly absorbed within the porous (co-)polymer particles being formed and dissolved in particular in the amorphous parts of the (co-)polymer. It may thus be observed that in the polymerization zone, the proportion of saturated and/or unsaturated heavy hydrocarbons in the gaseous reaction mixture may be from 1 to 50%, preferably from 2 to 20% and more especially from 2 to 15% by volume. The proportion of saturated and/or unsaturated heavy hydrocarbons absorbed and dissolved in the solid (co)polymer present in the polymerization zone may be from 0.1 to 20%, preferably from 0.5 to 15%, by weight.

The gaseous reaction mixture preferably circulates within the polymerization zone, at a total pressure greater than ambient atmospheric pressure, for example an absolute total pressure of 0.5 to 5 MPa, preferably of 1 to 3 MPa, and at a temperature below the melting point, more especially below the softening temperature of the (co)polymer produced, for example at a temperature of 30 to 120 20 C., preferably of 40° to 110° C. or of 60° to 105° C.

The (co)polymerization is generally performed by continuous or semi-continuous addition of a catalyst which is generally in the solid state and comprising at least one transition metal, such as titanium, vanadium, chromium, zirconium or hafnium. The catalyst may be chosen from catalysts of Ziegler-Natta type associated with a co-catalyst chosen from organometallic compounds of metals of groups I to III of the Periodic Classification of the Elements, for example organoaluminium and organozinc compounds, and also from heat-activated chromium oxide-based catalysts. The catalyst also may be chosen from metallocene comprising a transition metal e.g. titanocene, chromocene, zirconocene or hafnocene. The catalyst may be supported on porous refractory oxides such as silica or alumina, or may be combined with solid magnesium compounds such as magnesium chloride, oxide or hydroxychloride or a magnesium alkoxide. A solid catalyst based on magnesium, on halogen, on titanium and/or on vanadium may in particular be used. The catalyst may also be used in the form of an olefin prepolymer.

The (co)polymer continuously produced in the polymerization zone may either be a homopolyethylene or a copolymer of ethylene with at least one alpha-olefin and possibly with a non-conjugated diene, such as the alpha-olefins and the dienes mentioned above. It may be a high-density polyethylene, in particular with a density of 0.94 to 0.97 g/cm$^3$ or a linear low-density polyethylene, in particular with a density greater than or equal to 0.88 and less than 0.94 g/cm$^3$, or alternatively an elastomeric copolymer of EPR or EPDM type, in particular with a density of less than 0.88 g/cm$^3$ and more particularly with a density of 0.85 to 0.86 g/cm$^3$. It is provided in the form of a powder consisting of porous particles with a weight average diameter Dw which may range from 400 to 3000, preferably from 500 to 2000 and more especially from 600 to 1500 µm, and a relatively narrow particle size distribution such that the ratio of Dw to the number average diameter Dn of the particles is between 1 and 4, preferably between 1.1 and 3.5 and in particular from 1.2 to 3. The (co)polymer powder may be characterized by flow properties and may in particular be defined by a classification given in "Gas Fluidization Technology" edited by D. Geldart and published by A. Wiley-Interscience Publication/John Wiley & Sons (1986), chapter 3, pages 33 to 52: the powder may generally correspond, according to this classification, to the groups B and D in particular and preferably to group B. As noted above, under the conditions for polymerization, the (co)polymer powder may contain large amounts of absorbed and dissolved, saturated and/or unsaturated heavy hydrocarbons. It additionally contains active catalytic residues which may be identified in the form of transition metals and possibly of organometallic compounds such as organoaluminium and organozinc compounds. Their amounts are generally very low, such that the catalytic residues may remain in the final (co)polymer. In particular,- the transition metal content in the (co)polymer produced is less than 20 parts per million (ppm) by weight, preferably from 1 to 15 and more particularly from 1 to 10 ppm, or even less than 1 ppm.

The mixture (A) formed by the (co)polymer powder and the gaseous reaction mixture accompanying the powder is transferred from the polymerization zone into a depressurization zone. The transfer may be performed continuously or, preferably, semi-continuously or intermittently, for example by isolating a determined volume of the mixture (A) withdrawn from the polymerization zone in an intermediate chamber fitted with valves, before transferring the said mixture into the depressurization zone. This may in particular be performed according to the method described in European Patent Application No. 0 250 169. The transfer is essentially carried out by difference in pressure between the polymerization and depressurization zones. The absolute pressure which governs in the depressurization zone is in the region of ambient atmospheric pressure, in particular a pressure of 0.1 to 0.4 MPa, preferably from 0.1 to 0.3 MPa, in particular from 0.11 to 0.25 MPa.

Separation of the mixture (A) into a solid phase (B) and a gaseous phase (C) may be preferably carried out continuously and may take place essentially by the pressure reduction in the depressurization zone, which pressure is brought to the abovementioned level. During the separation of the mixture (A), the temperature of the mixture is in the region of that of the temperature governing in the polymerization zone or slightly below this, for example a temperature of 30° to 115° C., preferably of 40° to 105° C. or of 55° to 100° C. The solid phase (B) may be separated from the gaseous phase (C) simply by flowing out, for example by gravity, in the depressurization zone. Thus, the solid phase (B) may be recovered in the lower part of the depressurization zone. The gaseous phase (C) may essentially comprise the gaseous reaction mixture accompanying the (co)polymer powder during its transfer, as well as the constituents of the said gaseous reaction mixture and the possible saturated and/or unsaturated heavy hydrocarbons which are initially absorbed and dissolved in the powder and which are progressively degassed during the transfer and the separation in the depressurization zone. The gaseous phase (C) is preferably continuously returned directly or indirectly into the polymerization zone using, for example, a compressor. It may in particular be returned to any point of the recycling circuit of the gaseous reaction mixture.

The solid phase (B) separated from the gaseous phase (C) may essentially comprise the (co)polymer powder of the mixture (A) with a smaller amount of the constituents of the gaseous reaction mixture and of the possible saturated and/or unsaturated heavy hydrocarbons which have not yet been removed. Generally, when the solid phase is subjected to the operation consisting solely of the separation described above, the average residence time of the (co)polymer powder in the depressurization zone is preferably relatively short, because the powder contains active catalytic residues in an active polymerization atmosphere. The average residence time may be approximately from a few seconds to a few minutes, for example from 5 to 600 seconds, preferably from 10 to 300 or from 30 to 200 seconds. The solid phase (B) may generally have physical characteristics and flow properties which are similar to those defined above for the (co)polymer powder in the polymerization zone.

The solid phase (B) is subsequently subjected preferably continuously to at least one non-deactivating flushing with a gas or a gaseous mixture which is substantially free from any poison with respect to the active catalytic residues. In particular, the content of poisons in the gas or in the gaseous mixture for flushing preferably cannot be greater than that of the gaseous reaction mixture circulating in the polymerization zone. Thus, it is generally estimated that the content of poisons such as water, oxygen, alcohols, carbon monoxide and carbon dioxide, in the gaseous reaction mixture is less than 2 parts by volume per million (vpm), preferably less than 1 vpm and more particularly less than 0.5 or even 0.1 vpm. The gas or the gaseous mixture for flushing may be chosen from nitrogen, the gaseous reaction mixture and one or more of the constituents of the said gaseous reaction mixture, preferably mixed with nitrogen. It is preferred to use the gaseous reaction mixture which circulates in the polymerization zone and some of which may be withdrawn in order to flush the solid phase (B) continuously. In this case, the gaseous reaction mixture may preferably be used at a temperature equivalent to or in the region of that of the polymerization zone, or possibly at a lower temperature obtained by prior cooling of the said mixture, for example a temperature of 20° to 110° C. or of 45° to 105° C., preferably of 60° to 100° C. It may also be preferred to use one or more of the constituents, preferably the hydrocarbon constituents, of the gaseous reaction mixture, in particular ethylene, alpha-olefins and alkanes such as those mentioned above. In this case, it is preferred to use one or more of these constituents as a mixture with nitrogen, at a temperature which may be from 50° to 110° C., or from 45° to 105° C., preferably from 60° to 100° C. The proportion of nitrogen in the mixture may be from 30 to 90%, preferably from 40 to 80%, by volume.

Advantageously the gaseous phase (D) resulting from the nondeactivating flushing may preferably continuously be sent, at least partly if not totally, directly or indirectly into the polymerization zone. It may be sent to any point of the recycling circuit of the gaseous reaction mixture. It may also undergo a fractionation, for example by cooling: a light fraction may thus be separated from a heavy fraction in this gaseous phase, each of the fractions being sent, in the gaseous or liquid state, to identical or different points of the polymerization zone or of the recycling circuit of the gaseous reaction mixture.

According to a first advantageous variant of the process, the separation of the mixture (A) and the non-deactivating flushing may be performed simultaneously in the depressurization zone. In this case, the gaseous phases (C) and (D) are sent together, directly or indirectly, into the polymerization zone, for example into the recycling circuit of the gaseous reaction mixture, possibly after having undergone a fractionation as described above.

A second advantageous variant of the process may consist in performing the non-deactivating flushing and the separation of the mixture (A) in a distinct manner. In this case, the gaseous phase (D) resulting from the non-deactivating flushing may advantageously be at least partly recycled as a flushing gas in the said non-deactivating flushing. The recycling may include a fractionation of the gaseous phase (D), for example by cooling, allowing the separation of a light fraction in the gaseous state which is recycled as a flushing gas in the non-deactivating flushing, and a heavy fraction in the liquid state which can be sent directly or indirectly into the polymerization zone, for example to any point of the recycling circuit of the gaseous reaction mixture.

Another variant of the process may also consist in performing at least two non-deactivating flushings, the first flushing according to the first variant, followed by the second flushing according to the second variant.

The average residence time of the solid phase subjected to the non-deactivating flushing may be in total from 2 to 180 and preferably from 5 to 120 minutes. During the separation of the mixture (A), the average residence time of the solid phase (B) in the depressurization zone may become identical to that mentioned above when, according to the first variant, the separation of the mixture (A) is performed simultaneously with the non-deactivating flushing. The non-deactivating flushing may preferably be performed at a temperature greater than the dew point of the flushing gas and below the melting point, preferably at the softening point of the (co)polymer. In particular, the temperature may be from 40° to 110° C., preferably from 45° to 105° C. or from 50° to 100° C. During the non-deactivating flushing, the absolute pressure may be in the region of or identical to that governing in the depressurization zone, in particular from 0.1 to 0.4 MPa, preferably from 0.1 to 0.3 MPa and more particularly from 0.11 to 0.25 MPa. When several non-deactivating flushings are performed, the temperature and pressure may be identical or different in each of the flushings.

Subsequently the solid phase resulting from the non-deactivating flushing is preferably continuously subjected to a deactivating flushing with a gaseous mixture of nitrogen, water and oxygen. The gaseous mixture essentially contains nitrogen and preferably very low amounts of water and oxygen. These amounts are preferably calculated relative to the (co)polymer subjected to the flushing, such that at least the majority of the catalytic residues of the (co)polymer is deactivated during this flushing. Thus, it is preferred for the water to be used in an amount of, for example, from 50 to 4000, preferably from 100 to 2000, parts by weight per million (ppm) relative to the (co)polymer flushed. It is also preferred for the oxygen to be used in an amount of, for example, from 5 to 1000 and preferably from 10 to 500 ppm relative to the (co)polymer flushed. The amounts of water and of oxygen may depend upon the contents of active catalytic residues in the (co)polymer. It has also been observed that if the amount of water was too high, bubbles or "lenses" could appear in the (co)polymer at the moment of conversion into granules or into the finished products e.g. films. It has also been noticed that if excessive amounts of oxygen were used, a certain degradation of the (co)polymer, for example by crosslinking, could occur during the conversion. The deactivating flushing has a remarkable effect on the removal of the saturated and/or unsaturated hydrocarbons which are absorbed and dissolved in the (co) polymer.

The average residence time of the solid phase subjected to the deactivating flushing may be from 0.2 to 5 hours, preferably from 0.5 to 3 hours and more particularly greater than 1 hour and less than 3 hours. The deactivating flushing may preferably be performed at a temperature above the dew point of the gaseous mixture for flushing, and below the melting point, preferably at the softening point of the (co)polymer. In particular, the temperature may be from 35° to 105° C., preferably from 40° to 100° C. or from 50° to 100° C. During the deactivating flushing, the absolute pressure may be identical to or in the region of that governing in the depressurization zone or in the non-deactivating flushing. In certain cases, it may be below or even above that governing in the non-deactivating flushing. It may, for example, be from 0.05 to 0.4 MPa, preferably from 0.1 to 0.3 MPa, in particular from 0.11 to 0.25 MPa.

The gaseous mixture for the deactivating flushing may advantageously be prepared by addition of oxygen or air to nitrogen or to a premixture of nitrogen and water, in particular using a compressor pump in which the carrier gas, sometimes also referred to as the vehicle gas, is nitrogen or the premixture. The dimensions of the compressor pump may be such that the flow rate for the addition of oxygen or of air is easily achieved without manipulation of a control valve. The advantage of the process appears when the carrier gas accidentally ceases to circulate, and when this cessation brings about an automatic arrest in the addition of oxygen or air. This appears as an important safety measure in order to avoid the production of gaseous mixtures with an explosive nature.

During the non-deactivating and/or the deactivating flushings, the flushing gas flows preferably countercurrently and continuously through the solid phase which may flow preferably by gravity. Flowing of the solid phase may advantageously take place according to one mode in a continuous dense phase, that is to say the flushing gas passing preferably continuously through the solid phase as an ascending current at a rate below the minimum fluidization rate, Vmf, of the solid phase, in particular a rate between 0.1×Vmf and 0.9×Vmf, preferably between 0.1×Vmf and 0.8×Vmf, for example an ascending rate of 1 to 10 cm/s or of 1 to 8 cm/s. This type of flushing is preferably used in each of the flushings of the process. The flushing gas is preferably continuously introduced into the lower part or the bottom of the downward flowing solid phase subjected to these flushings and e.g. contained in a vertical column. More particularly when in the deactivating flushing, the flushing gas flows countercurrently through the solid phase flowing downwards preferably by gravity, it is preferred to introduce separately and preferably continuously into the solid phase a portion or all of one or two constituent(s) of the flushing gas comprising a gaseous mixture of nitrogen, water and oxygen, and particularly at different levels of the downward flowing solid phase. Thus, it is preferred to introduce continuously into the solid phase flowing downwards e.g. by gravity a first mixture essentially comprising a gaseous mixture of nitrogen and oxygen preferably in the lower part or the bottom of the downward flowing solid phase, and at least a second mixture essentially comprising a gaseous mixture of nitrogen, water and optionally oxygen at a level higher than the introduction point of the first mixture. The (co-)polymer powder thus flushed is particularly dry and exhibits a low content of residual volatiles which would otherwise result in inferior product performance e.g. with formation of small "lenses" when the (co-)polymer is transformed into films.

The (co)polymer obtained by the process of the invention advantageously has an extremely low content of saturated and/or unsaturated hydrocarbons, such as ethylene or unconverted alpha-olefins and alkanes of low volatility. Simultaneously, by a synergy effect between the flushings and in particular the simultaneous use of water and oxygen which are diluted in nitrogen, a (co)polymer is obtained of remarkable whiteness and of a thermal stability such that, during the conversion into granules or into finished products, the characteristics of the (co)polymer such as the melt index or the weight-average molecular mass, virtually do not change or change very little. A reduction in the amount of known additives such as stabilizing agents or antioxidants may advantageously be performed during the conversion, without harming the thermal stability of the (co)polymer.

Measurement of the whiteness index (Wi) and the yellowing index (Yi-1) of the (co)polymers The method used is that described by ASTM-E-313 for the whiteness index (Wi) and by ASTM-D-1925 for the yellowing index.

The calorimeter used is the "HUNTER-LAB D 25-9" Ř automatic calorimeter with incorporated microprocessor, manufactured by HUNTERLAB.

It emerges from this method that when an increase in the degree of whiteness of a (co)polymer is observed, the value of the index (Wi) increases whereas that of the index (Yi-1) decreases.

Measurement of the melt index ($Mi_{2.16}$) of a (co) polymer

The melt index ($Mi_{2.16}$) is measured under a load of 2.16 kg, at 190° C., according to the method ASTM-D-1238—condition E.

Measurement of the content of volatile organic compounds in the (co)polymers

Measurement of the content of volatile organic compounds in the (co)polymers is performed according to the "static head-space" extraction method as described in its general principle by B. Kolb et al. in "Chromatographia", Vol. 15, No. 9 (1982), pages 587–594 and Vol. 19 (1984), page 113. The method consists in placing a sample of 0.5 g of (co)polymer in the chamber with a volume of 22 ml of the "Head-Space PERKIN-ELMER HS-40" R̂ apparatus manufactured by PERKIN-ELMER, and in heating to 100° C. the sample enclosed in the chamber, in which a thermodynamic equilibrium becomes established between the gaseous phase and the solid phase. Some of the gaseous phase is then injected into a "PERKIN-ELMER AUTOSYSTEM" R̂ reference gas chromatography apparatus manufactured by PERKIN-ELMER, and equipped with a "MEGA-BORE" R̂ reference chromatography column manufactured by CHROMPACK and flame ionization detection. The measurement is expressed in micrograms of a volatile organic compound containing 2 to 12 carbon atoms per gram of (co)polymer, i.e. in parts per million (ppm) by weight.

The non-limiting examples which follow illustrate the present invention.

EXAMPLE 1

A linear low-density polyethylene powder was produced by copolymerization of ethylene with 1-hexene in a fluidized bed reactor of diameter 0.75 m comprising a circuit for recycling the gaseous reaction mixture equipped with a compressor and a heat exchanger. The copolymerization was performed under an absolute pressure of 1.6 MPa and at a temperature of 80° C., in the presence of a catalyst of Ziegler-Natta type based on titanium, magnesium and chlorine, which is identical to that used in Example 1 of French Patent No. 2,405,961. The gaseous reaction mixture used for the copolymerization contained (% by volume) 30% of ethylene, 5% of 1-hexene, 9% of hydrogen and 56% of nitrogen. The copolymer thus obtained had a density of 0.916 g/cm$^3$ and a melt index, $MI_{2.16}$, of 2.7 g/10 minutes. The copolymer powder had an apparent density of 0.32 g/cm$^3$ and consisted of particles with a weight-average diameter of approximately 1000 μm. At the moment of its withdrawal from the reactor, the powder contained approximately 6% by weight of unconverted 1-hexene, which was absorbed and dissolved in the copolymer. The powder additionally contained active catalytic residues, in particular 15 ppm of titanium.

The copolymer powder accompanied by part of the gaseous reaction mixture was transferred according to a semi-continuous mode and at a flow rate of 60 kg/h from the reactor into an intermediate chamber fitted with rotating valves, as described in EP-A-0 250 169, and then into a depressurization zone governed by an absolute pressure of 0.127 MPa. The powder flowed out by gravity in the depressurization zone, whereas a gaseous phase separated from it. Simultaneously, a non-deactivating flushing was performed continuously in the depressurization zone by introducing, into the lower part of the said zone, some of the gaseous reaction mixture passing through the polymerization zone, which was withdrawn in the recycling circuit, as flushing gas, at a temperature of 80° C. The flushing gas passed in countercurrent to the powder, which flowed out by gravity according to a dense continuous phase mode. It circulated at a flow rate of 10 Nm$^3$/h and at an ascending rate below the minimum rate of fluidization of the powder.

The gaseous phase resulting from the separation and from the non-deactivating flushing of the powder was sent via a compressor into the recycling circuit and consequently into the fluidized bed reactor. The average residence time of the powder in the depressurization zone was approximately 5 minutes and the temperature of the powder was approximately 75° C.

The powder was subsequently continuously transferred from the depressurization zone to the top of a column of diameter 0.4 m and of height 8 m, ending in a conical base pointing downwards. The powder was introduced continuously into this column by a rotating valve at a flow rate of 60 kg/h in order to undergo a deactivating flushing. The temperature of the powder in the column was 65° C. and the absolute pressure was 0.115 MPa. The powder settled out towards the bottom of the column according to a dense continuous phase regime. A gaseous mixture consisting of nitrogen and small amounts of water and oxygen was produced by successive additions of water and air to nitrogen by means of a compressor pump, and was preheated to 80° C. before being introduced into the base of the column. Various amounts of water and of oxygen used in the gaseous mixture are mentioned in Table 1. The gaseous mixture used as deactivating flushing gas was introduced continuously at a flow rate of 10 kg/h and rose in the column in countercurrent to the powder. The powder exited continuously at the base of the column by means of a rotating valve. The average residence time of the powder in the column was 2.5 hours.

Table 2 indicates the residual contents of volatile organic compounds in the copolymer following entry into and exit from the deactivating flushing column.

The copolymer powder exiting the column was converted into granules using an "APV MP 2065" R̂ granulator manufactured by APV Baker Ltd.

During the granulation, various additive compositions (antioxidants, stabilizing agents) were added to the copolymer:

a composition M containing, by weight relative to the copolymer:
  1000 ppm of calcium stearate,
  300 ppm of "IRGANOX 1010" R̂ manufactured by CIBA-GEIGY, and
  800 ppm of "IRGAFOS PEPQ" R̂ sold by CIBA-GEIGY;

a composition N containing, by weight relative to the copolymer:
  500 ppm of calcium stearate,
  150 ppm of "IRGANOX 1010" R̂ and
  400 ppm of "IRGAFOS PEPQ" R̂

Table 3 shows the change in melt index of the copolymer before and after granulation, as well as the whiteness and yellowing indices for the granules obtained.

Analysis of Tables 2 and 3 shows that, according to the process of the invention, the residual contents of volatile organic compounds were extremely low, and that simultaneously the copolymer had a very high thermal stability during the granulation and a remarkable whiteness, even when the additives were reduced (antioxidants, stabilizing agents) as in the composition N. The very high thermal stability is shown by the very low variation in the melt index, $MI_{2.16}$, of the copolymer before and after granulation, even when the composition N of low formulation was used.

TABLE 1

Conditions of the deactivating flushing

| Test | Flow rate of air | Proportion of oxygen relative to the copolymer | Flow rate of water | Proportion of water relative to the copolymer |
|---|---|---|---|---|
| A (comparative) | 0 | 0 | 24 g/h | 400 ppm |
| B | 20 Nl/h | 100 ppm | 18 g/h | 300 ppm |

TABLE 2

Residual contents of volatile $C_2$ to $C_{10}$ organic compounds in the copolymer before and after the deactivating flushing

| Test | Condition | $C_2$ | $C_4$ | $C_6$ | $C_8$ | $C_{10}$ |
|---|---|---|---|---|---|---|
| B | before | 5 ppm | 10 ppm | 5000 ppm | 100 ppm | 15 ppm |
| B | after | 0 ppm | 0.4 ppm | 5 ppm | 10 ppm | 10 ppm |

TABLE 3

Properties of the copolymer before and after granulation

| Property | Test A (comparative) | Test B | Test A (comparative) | Test B |
|---|---|---|---|---|
| $MI_{2.16}$ before granulation | 2.7 | 2.7 | 2.7 | 2.7 |
| Composition (antioxidant, stabilizing agent) | M | M | N | N |
| $MI_{2.16}$ after granulation | 2.1 | 2.5 | 2.1 | 2.6 |
| Wi | 59 | 64 | 52 | 65 |
| Yi-1 | 1.4 | 0.1 | 4.3 | −0.35 |

EXAMPLE 2

The process was performed exactly as in Example 1, except that the 1-hexene was replaced by 4-methyl-1-pentene and the gaseous reaction mixture contained (% by volume) 37% of ethylene, 7% of hydrogen, 10% of 4-methyl-1-pentene and 46% of nitrogen. The copolymer thus obtained had a density of 0.918 g/cm³ and a melt index, $MI_{2.16}$, of 0.9 g/10 minutes. The copolymer powder had an apparent density of 0.3 g/cm³ and consisted of particles having a weight-average diameter of 1100 μm, a titanium content of 8 ppm and, at the moment of its removal from the reactor, a content of 6% by weight of unconverted 4-methyl-1-pentene which was absorbed and dissolved in the copolymer.

Table 4 indicates the amounts of water and of oxygen used during the deactivating flushing.

Table 5 indicates the residual contents of volatile organic compounds in the copolymer following entry into and exit from the deactivating flushing column.

During the granulation, various additive compositions (antioxidants, stabilizing agents) were used:

a composition P containing, by weight relative to the copolymer:
1000 ppm of calcium stearate,
200 ppm of "IRGANOX 1010" Ȓ, and
800 ppm of "IRGAFOS 168" Ȓ sold by CIBA-GEIGY;

a composition Q containing, by weight relative to the copolymer:
500 ppm of calcium stearate,
100 ppm of "IRGANOX 1010" Ȓ and
400 ppm of "IRGAFOS 168" Ȓ

Table 6 shows the whiteness and yellowing indices for the granules obtained.

Analysis of Tables 5 and 6 shows that low amounts of oxygen and of water had remarkable effects on the whiteness of the copolymer, even with a composition Q comprising a low amount of additives (antioxidants, stabilizing agents), and that according to the process of the invention, simultaneously, the residual contents of volatile organic compounds were extremely low.

TABLE 4

Conditions of the deactivating flushing

| Test | Proportion of oxygen relative to the copolymer | Proportion of water relative to the copolymer |
|---|---|---|
| C (comparative) | 0 ppm | 350 ppm |
| D | 50 ppm | 300 ppm |

TABLE 5

Residual contents of volatile $C_2$ to $C_{10}$ organic compounds in the copolymer before and after the deactivating flushing

| Test | Condition | $C_2$ | $C_4$ | $C_6$ | $C_8$ | $C_{10}$ |
|---|---|---|---|---|---|---|
| D | before | 5 ppm | 2 ppm | 6000 ppm | 50 ppm | 10 ppm |
| D | after | 0 ppm | 0.2 ppm | 5 ppm | 10 ppm | 2 ppm |

TABLE 6

Properties of the copolymer after granulation

| Property | Test C (comparative) | Test D | Test C (comparative) | Test D |
|---|---|---|---|---|
| Composition (antioxidants stabilizing agents) | P | P | Q | Q |
| Wi | 57 | 70 | 56 | 69 |
| Yi-1 | 3.1 | −2.4 | 3.4 | −2.3 |

EXAMPLE 3

The process was performed exactly as in Example 1, except that the 1-hexene was replaced by 1-butene and that the gaseous reaction mixture used for the copolymerization contained (% by volume) 36% of ethylene, 2% of 1-butene, 20% of hydrogen, 34% of nitrogen, 6% of n-pentane and 2% of isopentane, at a temperature of 91° C. The copolymer thus obtained had a density of 0.950 g/cm³ and a melt index, $MI_{2.16}$, of 11 g/10 minutes. The copolymer powder had a density of 0.38 g/cm³ and consisted of particles with a weight-average diameter of approximately 1100 μm. At the moment of its removal from the reactor, the powder contained approximately 4% by weight of $C_5$ alkanes which were absorbed and dissolved. It additionally contained active catalytic residues, in particular 7 ppm of titanium.

The copolymer powder exiting the reactor underwent separation into a solid phase and a gaseous phase and a non-deactivating flushing of the solid phase under identical conditions to those of Example 1, except that the flow rate of the copolymer powder transferred from the reactor to the depressurization zone was 100 kg/h and that the temperature of the powder in the depressurization zone was approximately 80° C.

The powder was subsequently continuously transferred from the depressurization zone to the top of the deactivating flushing column as described in Example 1. The flow rate of powder introduced into the column was 100 kg/h. The temperature of the powder in the column was 65° C. and the absolute pressure was 0.11 MPa.

A gaseous mixture consisting of nitrogen and of low amounts of water and of oxygen was introduced as deactivating flushing gas in counter-current to the powder according to identical conditions to those of Example 1, except for the fact that the average residence time of the powder in the column was 2 hours. Table 7 indicates the amounts of water and of oxygen introduced.

Table 8 indicates the residual contents of volatile organic compounds in the copolymer following its entry into and exit from the deactivating flushing column.

The copolymer powder exiting the column was granulated as in Example 1, except that a composition of additives (antioxidants, stabilizing agents) was used, containing, by weight relative to the copolymer:

1500 ppm of calcium stearate, 1000 ppm of "IRGAFOS 168" Ř and 250 ppm of "DSTDP" Ř manufactured by REAGENS.

Table 9 indicates the whiteness and yellowing indices of the granules.

Analysis of Tables 8 and 9 shows that, according to the process of the invention, the residual contents of volatile organic compounds are extremely low and that, simultaneously, the copolymer has a remarkable whiteness.

TABLE 7

| | Conditions of the deactivating flushing | |
|---|---|---|
| Test | Proportion of oxygen relative to the copolymer | Proportion of water relative to the copolymer |
| E (comparative) | 0 ppm | 1100 ppm |
| F | 100 ppm | 1000 ppm |

TABLE 8

Residual contents of volatile $C_4$ to $C_{10}$ organic compounds in the copolymer before and after the deactivating flushing

| Test | Condition | $C_4$ | $C_5$ | $C_6$ | $C_8$ | $C_{10}$ |
|---|---|---|---|---|---|---|
| F | before | 30 ppm | 600 ppm | 100 ppm | 250 ppm | 100 ppm |
| F | after | 0.2 ppm | 2 ppm | 1 ppm | 30 ppm | 70 ppm |

TABLE 9

| | Properties of the copolymer after granulation | |
|---|---|---|
| Property | Test E (comparative) | Test F |
| Wi | 57 | 70 |
| Yi-1 | 0.1 | −0.33 |

We claim:

1. Process for the continuous manufacture of an ethylene (co)polymer by catalytic (co)polymerization of ethylene with optionally at least one comonomer in a polymerization zone, in a gaseous phase through which passes a gaseous mixture comprising ethylene and optionally the comonomer, at a pressure greater than atmospheric pressure, characterized in that the process additionally comprises:

transferring a mixture (A) formed by the gaseous reaction mixture comprising the unconverted (co)-monomer(s) and the solid (co)polymer containing active catalytic residues, from the polymerization zone to a depressurization zone, and separating the mixture (A), after reduction of the pressure, into a solid phase (B) and a gaseous phase (C) which is sent directly or indirectly into the polymerization zone, the solid phase (B) being subjected to:

(1) at least one non-deactivating flushing with a gas or a gaseous mixture, which is essentially free from any poison with respect to the active catalytic residues and which is selected from the group consisting of nitrogen, said gaseaous reaction mixture, and one or more of the consitutents of said gaseous reaction mixture mixed with nitrogen, resulting in a gaseous phase (D), and subsequently (2) a deactivating flushing with a gaseous mixture of nitrogen, water and oxygen, characterized in that the amount of water used in the deactivating flushing is from 50 to 4000 parts by weight per million relative to the (co)polymer flushed.

2. Process according to claim 1, characterized in that the gaseous phase (D) resulting from the non-deactivating flushing is sent directly or indirectly to the polymerization zone.

3. Process according to claim 1 or 2, characterized in that the separation of the mixture (A) and the non-deactivating flushing are performed simultaneously in the depressurization zone and that the gaseous phase (C) and the gaseous phase (D) resulting from the non-deactivating flushing are sent together, directly or indirectly, to the polymerization zone.

4. Process according to claim 1 or 2 characterized in that the gaseous phase (D) resulting from the non-deactivating flushing performed in a distinct manner from the separation of the mixture (A) is at least partly recycled as a flushing gas in the non-deactivating flushing.

5. Process according to claim 1 or 2 characterized in that the gaseous reaction mixture used in the polymerization zone comprises ethylene, hydrogen, at least one inert gas and possibly at least one olefinic comonomer.

6. Process according to claim 1 or 2 characterized in that during the non-deactivating flushing and/or the deactivating flushing, the solid phase flows out by gravity into a dense continuous phase in countercurrent to the flushing gas.

7. Process according to claim 1 or 2 characterized in that the average residence time of the solid phase subjected to the non-deactivating flushing is in total from 2 to 180 minutes.

8. Process according to claim 1 or 2 characterized in that the non-deactivating flushing is performed at a temperature of 40° to 110° C., at an absolute pressure of 0.1 to 0.4.

9. Process according to claim 1 or 2 characterized in that the average residence time of the solid phase subjected to the deactivating flushing is from 0.2 to 5 hours.

10. Process according to claim 1 or 2 characterized in that the deactivating flushing is performed at a temperature of from 35° to 105° C., and at an absolute pressure of from 0.05 to 0.4 MPa.

11. Process according to claim 1 or 2 characterized in that the gaseous mixture for the deactivating flushing is prepared by addition of oxygen to nitrogen or to a premixture of nitrogen and water, the addition being performed using a compressor pump in which the carrier gas is nitrogen or the premixture of nitrogen and water.

12. A process according to claim 1 wherein said amount of water is from 100 to 2000 parts by weight per million relative to the (co)polymer flushed.

* * * * *

UNITED STATES PATENT AND TRADEMARK OFFICE
CERTIFICATE OF CORRECTION

PATENT NO. : 5,789,501
DATED : August 4, 1998
INVENTOR(S) : Geoffrey Chapman et al.

It is certified that error appears in the above-indentified patent and that said Letters Patent is hereby corrected as shown below:

Column 4, line 4, "12020 C." should read --120° C.--

Column 8, lines 57 and 58, correct "calorimeter" to read --colorimeter--

Column 14, line 31, "gaseaous" should read --gaseous--

Signed and Sealed this

Twelfth Day of January, 1999

Attest:

*Attesting Officer*

*Acting Commissioner of Patents and Trademarks*